Figure 1:
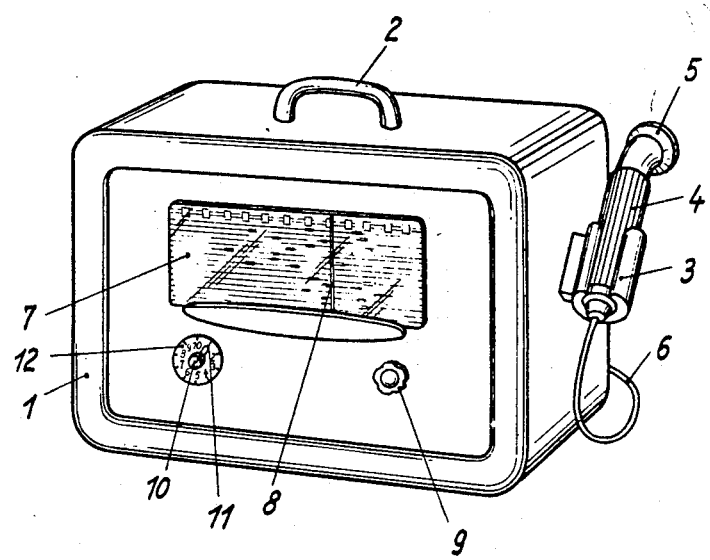

March 10, 1959 W. GÜTTNER ET AL 2,876,764
ULTRASONIC TREATMENT APPARATUS
Filed Aug. 31, 1955 4 Sheets-Sheet 1

Inventors.
Werner Güttner &
Günter Pickel.

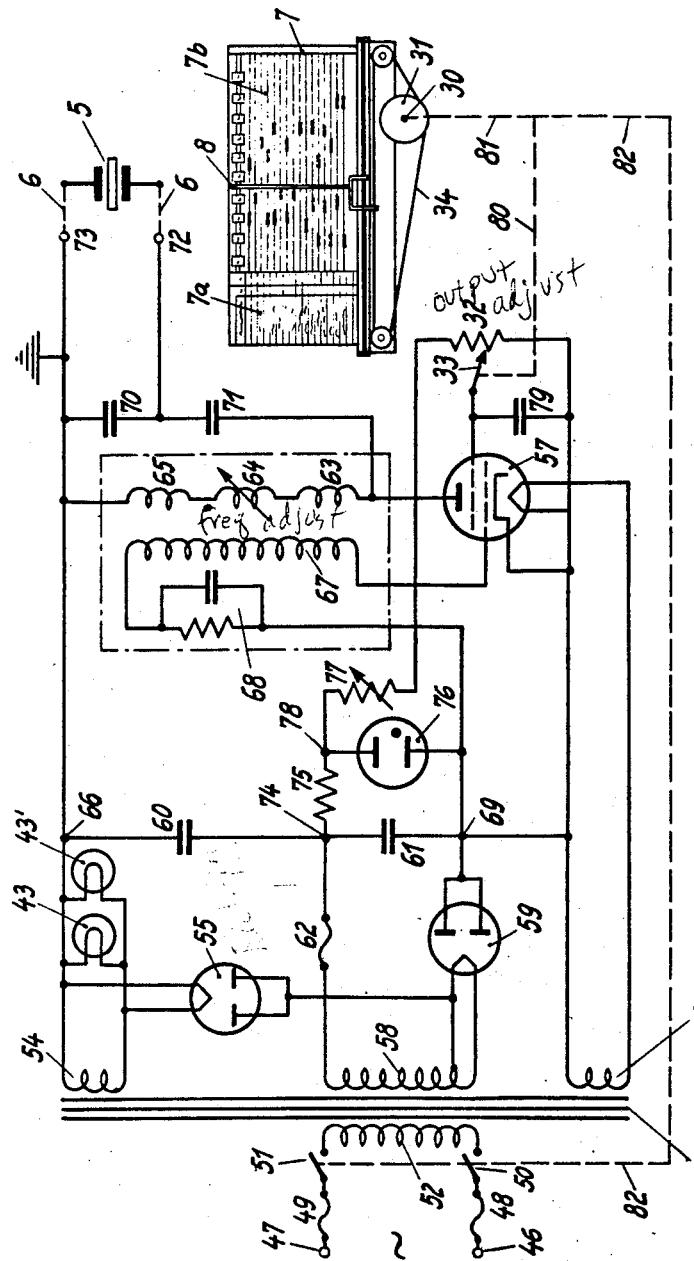

United States Patent Office 2,876,764
Patented Mar. 10, 1959

2,876,764

ULTRASONIC TREATMENT APPARATUS

Werner Güttner and Günter Pickel, Erlangen, Germany, assignors to Siemens-Reiniger-Werke A. G., Erlangen, Germany Application August 31, 1955, Serial No. 531,787

Claims priority, application Germany June 18, 1955

12 Claims. (Cl. 128—24)

This invention relates to an apparatus for the medical treatment with ultrasonics, of the type comprising a control member for variable adjustment of the supersonic output, and it has special reference to a supersonic apparatus comprising an oscillator for electric high-frequency oscillations, an electroacoustic transformer fed by this oscillator, and a control member for variable adjustment of the voltage supplied to the transducer.

In the known apparatus for medical treatment with ultrasonics the variable adjustment of the output is effected on the basis of a measurement and indication either of the input of the ultrasonic vibrator or of its output. In apparatus having an electroacoustic transducer as a rule an electric quantity of this vibrator which varies with the output of the electric high-frequency oscillator is measured and indicated. It is also known, however, to measure and indicate the radiation pressure of the ultrasonic radiation.

When using these known apparatuses, the physician must have a sense for the relation between the measured and indicated output or input, which corresponds to the variable output adjustment of the apparatus, and the desired result of the treatment. However, it is very difficult to develop a reliable sense for this relation, in view of the fact that the mechanism of the action of the ultrasonic radiation in the biological tissue is not yet fully analyzed scientifically.

In the known apparatuses, measuring instruments calibrated in terms of "watts" are used for indicating the electrical quantity of the high-frequency oscillator changing with the output thereof, but also for measuring and indicating the radiation pressure of the ultrasonic radiation delivered. The electrotechnical term of "watt" is not familiar to the physician for defining an acoustic quantity which he would more readily refer to the result of the medical treatment.

It is an object of the present invention to provide means for removing this deficiency, in such a way that the physician need not make a decision as to the amount of the ultrasonic output to be chosen for the treatment in question, since the ultrasonic output to be applied is adjusted according to medical terms or designations.

With this and further objects in view, the device according to the present invention comprises a control member for adjusting the ultrasonic output, an indicator which is positively readjusted together with the control member, and a field or panel with marks adapted to be swept by the indicator and assigned to the various methods of medical treatment. The marks may be assigned to the various kinds of treatment by applying designations on the marks, or by applying the designations on a coordinate of a field or panel defined by two coordinates arranged at right angles to each other, or in any other way which is known for marking the coordination of marks. Such an adjusting board associated to the output control may be adjusted, as regards the distribution of the marks in the panel swept by the indicator, already by the manufacturer of the device, basing on experiences after the carrying out of a great number of different treatments, all of which had a favorable result, in such a way that the indicator comes into the range of a mark belonging to a predetermined kind of medical treatment only, if the optimum output for this kind or method of medical treatment has been adjusted. The physician in this case when using the apparatus merely has to bring the control member into the position in which the indicator coincides with the mark assigned to the medical indication to be applied. Hence he can carry out the adjustment of the output according to medical terms.

According to a special feature of the invention the adjusting panel may be subdivided into a field swept by the indicator and a field containing the designations, in such a way that always only one designation and one mark are arranged in a line which is common to the two fields.

According to a further feature of the invention, further entries which are of importance for the respective treatment may be associated to the marks. Such important further entries are especially statements on the times of treatment which are most favorable with the respective method of treatment and with the supersonic outputs provided therefore. By applying such entries the physician is given clear hints regarding the dose of supersonic energy to be applied. These further entries also may be provided on the marks themselves or they may be assigned to them so as to be easily distinguishable.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 2:
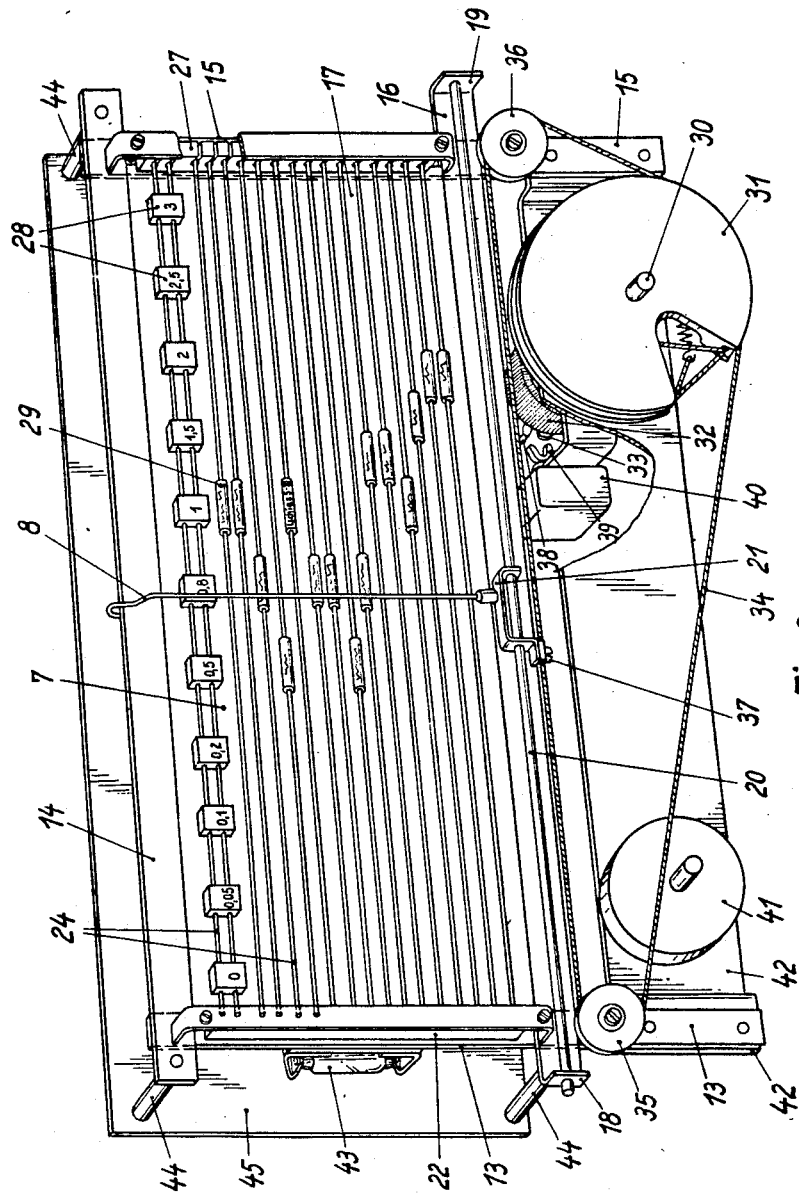
Figure 3:
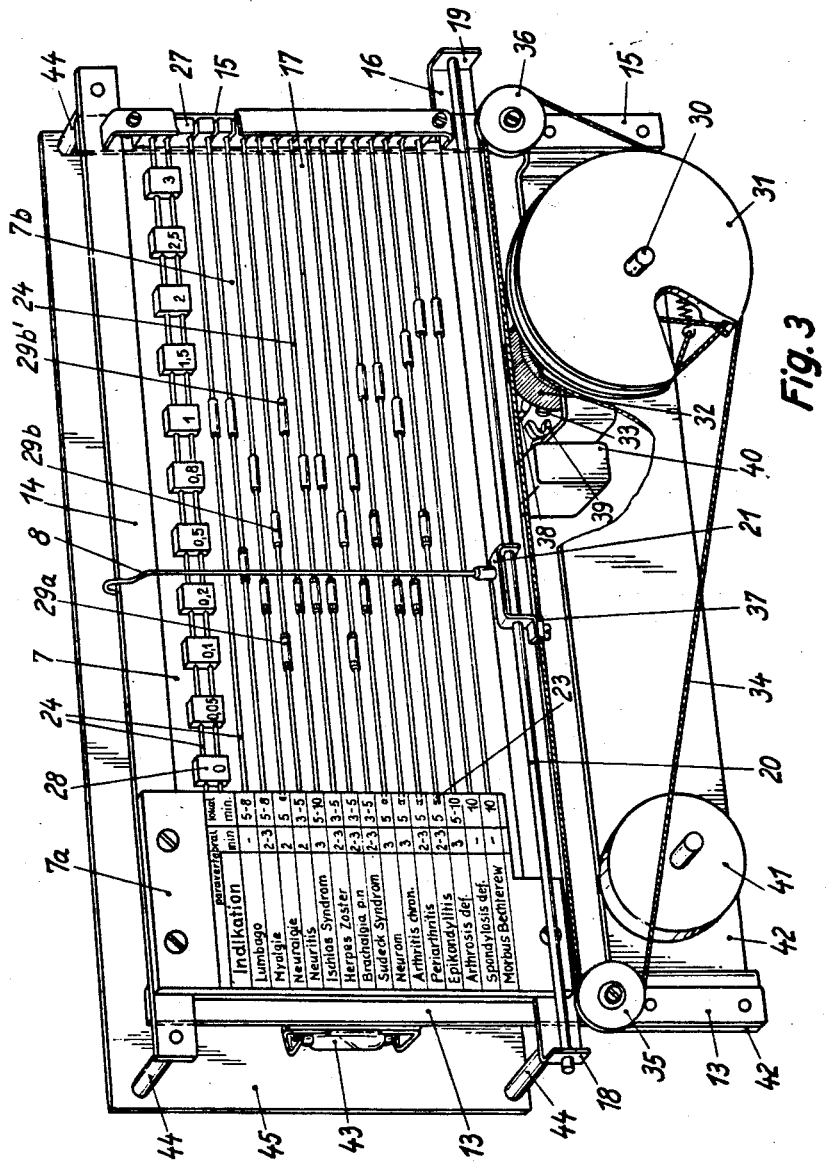

Fig. 1 is a perspective total view of a supersonic treatment apparatus having the invention applied thereto, Fig. 2 is a perspective view, on a larger scale, of the adjusting board of the apparatus including the adjusting device for the indicator sweeping the index panel, Fig. 3 is a perspective view of a modified form of the adjusting panel or board of Fig. 2, and Fig. 4 is a circuit diagram of the apparatus shown in Fig. 1, in connection with the setting member of the adjusting panel.

Similar reference numerals denote similar parts in the different views.

Referring now to the drawings in greater detail, and first to Fig. 1, it will be seen that the apparatus is housed in a box-shaped casing 1 which contains the parts required for carrying out supersonic treatments and is provided on its top with a handle 2. Fastened to the right hand side wall of the casing 1 is a sleeve-shaped member 3 for reception in case of non-use, of the tubular ultrasonic massage handpiece 4 carrying on its face the supersonic head 5. The ultrasonic massage handpiece 4 is detachably connected, through a cable 6 adapted to be plugged into the rear wall of the casing, with the output terminals of the apparatus. A part of the front of the casing 1 forms the adjusting panel 7 over which the indicator 8 is slidable, parallelly to itself, along a horizontal line. The panel 7 is covered by an easily detachable transparent protective glass pane. Provided below the adjusting panel 7 are the rotary knob 9 for adjusting the output and the rotary knob 10 of a clockwork. With each adjustment of the rotary knob 9 the indicator 8 is automatically adjusted too. By means of the rotary knob 10 the clockwork can be wound up for a desired length of time indicated by the hand or pointer 11 on the scale 12. When letting go the knob 10 it will run down, the knob 10 and the hand 11 being returned to their position of rest, in a counter-clockwise direction. When reaching the position of rest, a bell signal will indicate the termination of the time of treatment.

The adjusting board or panel shown in Fig. 2 comprises a frame which is formed of four strips 13, 14, 15, 16 arranged at right angles to each other and being backed by a ground- or milk-glass pane 17. The ends of the strip 16 are bent off at right angles and the bent-off parts 18 and 19 are provided with bores for accommodating and holding a rod 20 which serves for the slidable mounting of a U-shaped member 21 carrying the indicator 8. A bar 22 is placed on the part of the strip 13 situated between the strips 14 and 16, and a bar 27 is placed on the corresponding part of strip 15, for the insertion of parallel transparent rods 24 in corresponding recesses of the bars 22 and 27. Slidable marks 28 are provided on the two upper rods 24 and provided with output markings denoting ultrasonic outputs in watts per square centimeter which can be delivered by the transducer. The slidable marks 29 on the other rods are provided with denotations marking the kind of medical treatment, e. g. names of diseases or organs. As soon as the indicator 8 is brought to coincidence with one of the marks 28 indicating output values, e. g. with the mark denoted 1, which coincidence can be effected by adjustment of the wheel 31 fixed on the shaft 30 in a manner which is well known from the radio technique for adjusting the indicator sliding over the station scale when operating the turning knob, the sliding contact 33 of the output regulator 32, which is coupled with the shaft 30, is also adjusted. This regulator in known manner consists of a resistance wire wound up on an annular carrier, the sliding contact 33 sliding on the resistance wire. The adjusting knob 9, Fig. 1, may be secured on the shaft end 30 shown in Fig. 2. As a result of the change of the resistance of the potentiometer 32 caused by rotation of the shaft 30, the output adapted to be supplied by the ultrasonic head 5, Fig. 1, is varied as will be hereinafter described with reference to Fig. 4. The wheel 31 carries on its circumference grooves for the reception of the scale rope 34 which is guided over the deflecting rollers 35 and 36 secured on the strips 13 or 15 and on rotation of the wheel 31—e. g. in a clockwise direction—moves the indicator stirrup 21 clamped to the rope 34 and 37, in a longitudinal direction of the rod 20, to the right. Provided on the (not visible) end of the shaft 30, on which the sliding contact 33 of the potentiometer 32 is secured, is also a lever 38 which in case of a readjustment of the shaft 30 in a counter-clockwise direction approximately at the position corresponding to zero output engages the U-member 39 of the switch 40 fastened on the potentiometer 32, as soon as the sliding contact 33 of the potentiometer has reached the end of the resistance path of the potentiometer 32 connected to the cathode of the generator tube (Fig. 4). In this position of the sliding contact 33 the indicator 8 is located approximately before the mark 28 denoted with the numeral "zero." On further rotation of the axis 30 in a counter-clockwise direction, the U-member 39 of the snap switch 40 is moved downwards and, as will be explained with reference to Fig. 4, disconnects the apparatus from its power supply.

Each of the marks 29 is moved into such a position on its rod, by the manufacturer of the apparatus, that when setting the indicator 8 to a determined mark, e. g., to the mark denoted "Ischiagra," the adjusted supersonic output available on the transducer owing to the automatic coupling of the indicator 8 with the sliding contact 33 of the potentiometer 32 corresponds to the optimum output required according to the experiences made in the treatment of ischiagra.

The marks 29 bearing the names of diseases or organs in addition to said names may show entries which are important for the respective tretament, e. g. suggestions regarding the time of treatment required in an actual case. Thus, on the mark denoted "Ischiagra" times of treatment "5 to 10" (minutes) may be inscribed for giving to the physician the suggestion to set the time clock 41, which is arranged on the board 42 fastened to the strips 13 and 15, the same as the potentiometer 32, for a time of treatment lying between the two indicated limits.

In order to permit the physician to adjust the indicator on the setting panel also in case of unfavorable conditions of illumination, small strip lamps 43 are arranged behind the strips 13 and 15 for illuminating the mark panel from the rear side. In order to increase the illuminating effect, a light-reflecting plate 45 is secured to the strips 14 and 16, by means of a holder 44, behind said lamps.

The setting device according to Fig. 3 differs from that according to Fig. 2 first by the fact that the marks 29 do not bear any inscription, whereby the store-keeping of such marks is substantially facilitated. Moreover the adjusting board 7 is panelled into two parts, i. e., the designation field 7a and the mark field 7b. The designation field 7a consists of a plate which is screwed on the strips 14 and 16. The diseases adapted to be treated with ultrasonics are inscribed thereon in successive lines, in terms familiar to the physician, and the times of treatment required for the respective treatment are also plotted thereon, separately for paravertebral and local treatment methods. The marginal surface of the rectangular plate 7a bearing the designations and located adjacent to the mark field 7b is provided with bores 23 serving, in accordance with the embodiment illustrated in Fig. 2, for receiving the ends of the rods 24 each of which carries at least one mark and is assigned to one line of the designation field 7a bearing the names of the diseases. If the physician wants to carry out an ischiagra treatment, he will find the respective designation of the disease on the plate 7a forming, so to speak, the ordinate of a rectangular coordinate system and bearing the names of the diseases, and he will find the name of this disease on this plate, in line 5. Provided on the rod 24 aligned with this line is the mark 29b' (below the output mark denoted "1") assigned to this name of disease; the indicator 8, extending in the direction of the ordinate and being slidable on the rod 20 along the abscissa of the coordinate system defining the mark field, accordingly has to be adjusted to this mark if the supersonic head 5, Fig. 1, is to supply an output which is favorable for the treatment of ischiagra.

In addition to each of the various names of diseases the designation field 7a contains information on the respective duration of treatment. As mentioned in connection with the above embodiment, 5 to 10 minutes are required for the local treatment of ischiagra. However, ischiagra also can be treated by paravertebral treatment, applying the supersonic head 5 to a part of the spine which is known to the physician. The marks for paravertebral treatments are especially designated and each of them bears at its end a black ring, said marks being denoted 29a in Fig. 3. In case of each of the diseases which can be treated both by paravertebral or local treatment—the respective diseases are mentioned in the field 7a in lines 2 to 13—therefore, two marks are slidably arranged on the rods 24 extending in the direction of the lines, the marks 29a assigned to the paravertebral treatments being distinguished from the marks 29b assigned to the local treatments as hereinbefore described. The indicator 8 accordingly is set to any of the marks 29b in case of local treatments, or to any of the marks 29a in case of paravertebral treatments, whereby the ultrasonic output required for the respective treatment is automatically fixed, so that the physician merely has to adjust the correct time of treatment by operating the rotary knob 10, Fig. 1, belonging to the time clock 41.

In the circuit diagram of Fig. 4 the voltage of the local alternating current power system is connected to the terminals 46 and 47 and fed to the primary winding 52 of the power transformer 53 through fuses 48 and 49 and switches 50 and 51. The secondary winding 54 of the transformer 53 feeds the filaments of the rectifier tube 55 and of the strip lamps 43 and 43'. The secondary winding 56 of the transformer supplies the heating voltage for the oscillator tube 57 constructed as a tetrode, while the secondary winding 58 serves both for supplying the heating voltage to the rectifier tube 59 and for producing the plate alternating-current voltage which is rectified in the rectifier tubes 55 and 59 operating in connection with the condensers 60 and 61 in a known voltage doubler circuit. The full rectified voltage serves for supplying the plate current for the oscillator tube 57, while a partial voltage thereof is fed to the screened grid of the oscillator tube. An anode fuse 62 is provided for protecting the rectifier tubes 55 and 59. The oscillator valve 57 operates in a known self-excited high-frequency connection. The plate circuit coil, consisting of a series connection of the inductances 63, 64, and 65, the free end of the inductance 63 being connected to the anode of the oscillator valve and the free end of the inductance 65 being connected on the one side with earth and on the other side with the positive pole of the source of high-tension direct current at 66, is inductively coupled with the grid circuit coil 67. The end of the grid circuit coil 67 is connected to the grid of the oscillator valve while its other end is connected, through a condenser resistance combination 68, with the point 69 of the source of high tension direct current which is at the high tension potential and negative relative to earth. Parallelly connected to the oscillatory circuit inductances 63, 64, 65, of which the inductance 64 is adjustable for adjustment of the frequency, are two series-connected condensers 70 and 71 forming the capacity of the oscillatory circuit. The connecting point of the two capacities 70 and 71 is connected to the terminal 72, while the earth point is connected to the terminal 73. The terminals 72 and 73 are the output terminals of the apparatus of which the high frequency voltage serving for feeding the electroacoustic transducer is taken. As has been explained in the description of Fig. 1, this voltage is fed, through the cable 6, to the supersonic massage handpiece 4 containing in its interior a transducer 5, e. g., a barium titanate oscillator or vibrator. The partial capacity 70 of the capacitive potentiometer forming the capacity of the oscillatory circuit is made large compared to the capacity 71, so as to obtain a favorable matching of the barium titanate oscillator or vibrator having a low impedance.

The variation of the supersonic output delivered by the vibrator 5 is effected by varying the electric high frequency tension on the output terminals 72 and 73. This tension can be varied by making the screen-grid direct voltage of the oscillator valve 57 adjustable. The screen-grid direct voltage is taken from the direct current circuit at the points 74 and 69 as part of the total plate voltage connected to the condenser 61, the point 69 being the negative and the point 74 being the positive pole of this partial voltage which for the sake of stabilization is fed to the stabilizer 76 consisting of a glow-discharge tube, through a resistance 75, and connected across the series-connected resistances 77 and 32 whose free ends are connected to the points 78 and 69. The resistance 32 is constructed as a potentiometer and represents the output control member illustrated in Figs. 2 and 3. The sliding contact 33 of the potentiometer 32 is connected with the screen-grid of the oscillator tube 57 which through a condenser 79 is connected to the cathode of this tube and to the point 69 of the source of high tension direct current, which point is negative in relation to earth.

As described with reference to Fig. 2, the sliding contact 33 of the potentiometer 32 is coupled with the axis 30 of the setting member of the adjusting board 7, this coupling being indicated by the interrupted line 80, 81. Moreover, the sliding contact 33, as indicated by the interrupted line 80, 82, is coupled with the switches 50 and 51 of the primary power circuit, so that the sliding contact 33 in its motion in the direction towards the end of the potentiometer winding 32 connected to the cathode of the oscillator valve 57 on reaching this end of the winding opens the switches 50 and 51, whereby both ends of the primary winding 52 of the power transformer 53 are separated from the power circuit. The variable resistance 77 connected in series with the potentiometer winding 32 is intended to limit the screen-grid voltage adapted to be fed to the screened grid of the oscillator valve 57 and serves mainly as a calibrating resistance for compensating variations of the voltage of the local power system. It is always regulated in such a way that when the indicator 8 is set to the output mark bearing the numeral 3, Figs. 2 and 3, on the adjusting board, the actually radiated supersonic output is 3 watts per square centimeter, which can be ascertained by testing the supersonic output radiated by the ultrasonic head 5, by means of an ultrasonic output meter.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

We claim:

1. An apparatus for medical treatment with supersonic energy, including an ultrasonic massage handpiece provided with a transducer, an oscillator circuit for electric high-frequency oscillations, said transducer of said ultrasonic massage handpiece electrically coupled to said oscillator and comprising a control member mechanically and electrically coupled to said oscillator circuit for regulating the available supersonic output of said oscillator circuit to said tranducer, a panel defined by two coordinates, arranged at right angles to each other, the first of said coordinates being provided with designations of various medical treatments, an indicator extending in the direction of one of said coordinates, said control member operatively and mechanically coupled to said indicator and including means for positively moving the indicator transversely to its longitudinal extension, in accordance with the adjustment of the control member, and slidable marks on said panel, certain of said marks provided with output markings denoting ultrasonic output in watts per square centimeter delivered by the transducer, and other of said marks being assigned to a kind of medical treatment for which the apparatus is adjusted if the indicator coincides with the respective mark.

2. An apparatus for medical treatment with supersonic energy, including an ultrasonic massage handpiece provided with a transducer, an oscillator circuit for electric high-frequency oscillations, said transducer of said ultrasonic massage handpiece electrically coupled to said oscillator and comprising a control member for regulating the available supersonic output of said oscillator circuit to said transducer, a panel defined by two coordinates, arranged at right angles to each other, the first of said coordinates being provided with designations of various medical treatments, an indicator extending in the direction of said first coordinate, said control member operatively and mechanically coupled to said indicator and including means for positively moving the indicator in the direction of the second coordinate, in accordance with the adjustment of the control member, and slidable marks on said panel, certain of said marks provided with output markings denoting ultrasonic output in watts per square centimeter delivered by the transducer, and other of said marks being assigned to a kind of medical treatment for which the apparatus is adjusted if the indicator coincides with the respective mark.

3. An apparatus for medical treatment with supersonic energy, including an ultrasonic massage handpiece provided with a transducer, an oscillator circuit for electric high-frequency oscillations, said transducer of said ultrasonic massage handpiece electrically coupled to said oscillator and comprising a control member mechanically and electrically coupled to said oscillator circuit for regulating the available supersonic output of said oscillator circuit to said transducer, a panel defined by an abscissa and an ordinate, the ordinate being provided with designations of various medical treatments, an indicator extending parallel to the ordinate, said control member operatively and mechanically coupled to said indicator and including means for positively moving the indicator in the direction of the abscissa, in accordance with the adjustment of the control member, and slidable marks on said field, certain of said marks provided with output markings denoting ultrasonic output in watts per square centimeter delivered by the transducer, and other of said marks being assigned to a kind of medical treatment for which the apparatus is adjusted if the indicator coincides with the respective mark.

4. An apparatus for medical treatment with supersonic energy, including an ultrasonic massage handpiece provided with a transducer, an oscillator circuit for electric high-frequency oscillations, said transducer of said ultrasonic massage handpiece electrically coupled to said oscillator and comprising a control member mechanically and electrically coupled to said oscillator circuit for regulating the available supersonic output of said oscillator circuit to said transducer, an indicator, an indicating field adapted to be swept by the indicator, and including a scale calibrated in terms of supersonic output, said control member operatively and mechanically coupled to said indicator and including means for positively moving the indicator in accordance with the adjustment of the control member, and slidable marks on said field, certain of said marks provided with output markings denoting ultrasonic output in watts per square centimeter delivered by the transducer, and other of said marks being assigned to a kind of medical treatment for which the apparatus is adjusted if the indicator coincides with the respective mark.

5. An apparatus for medical treatment with supersonic energy, including an ultrasonic massage handpiece provided with a transducer, an oscillator circuit for electric high-frequency oscillations, said transducer of said ultrasonic massage handpiece electrically coupled to said oscillator and comprising a control member mechanically and electrically coupled to said oscillator circuit for regulating the available supersonic output of said oscillator circuit to said trandsucer, an indicator, an indicating field adapted to be swept by the indicator and formed of parallel transparent rods and slidable marks secured on said rods, certain of said marks provided with output markings denoting ultrasonic output in watts per square centimeter delivered by the transducer, and other of said marks being assigned to a determined kind of medical treatment, and said control member operatively and mechanically coupled to said indicator and including means for positively moving the indicator over said field, in accordance with the adjustment of the control member, in such a way that the control member is always properly adjusted for the medical treatment characterized by the mark on which the indicator is actually set.

6. An apparatus for medical treatment with ultrasonic energy, including an ultrasonic massage handpiece provided with a transducer, an oscillator circuit for electric high-frequency oscillations, said transducer of said ultrasonic massage handpiece electrically coupled to said oscillator and comprising a casing, a control member mechanically and electrically coupled to said oscillator circuit for regulating the available ultrasonic output of said oscillator circuit to said transducer, an indicator, an indicator field adapted to be swept by the indicator, a field provided with denotations indicating various kinds of medical treatment, said two fields being arranged on the front face of the casing, adjacent to each other, slidable marks provided on said indicator field and associated to said denotations, and said control member operatively and mechanically coupled to said indicator and including means for positively moving the indicator in accordance with the adjustment of the control member, in such a way that the indicator always coincides with the mark associated to the kind of medical treatment for which the control member is adjusted.

7. An apparatus as per claim 6, in which the field provided with the denotations comprises a space for entries concerning the duration of treatment, said space being subdivided in two columns, one of said columns containing entries concerning the duration of treatment for paravertebral treatment while the other column contains entries on the respective duration of treatment in case of local treatment.

8. An apparatus as per claim 6, in which the field provided with the denotations comprises a space for entries concerning the duration of treatment, said space being subdivided in two columns, one of said columns containing entries concerning the duration of treatment for paravertebral treatment while the other column contains entries on the respective duration of treatment in case of local treatment, said marks being subdivided in two different groups distinguished from each other by different colours, one of said groups of marks being assigned to paravertebral treatments, while the other group of marks is assigned to local treatments.

9. Apparatus for medical treatment with ultrasonic energy, including an ultrasonic massage handpiece provided with a transducer and comprising a housing, an oscillator circuit for electric high-frequency oscillations, a control member mechanically and electrically coupled to said oscillator circuit for adjustably regulating the ultrasonic energy output of said oscillator circuit to said transducer, an indicating panel forming part of the front wall of said housing, said panel being subdivided into two indicating fields and having means forming a plurality of horizontally extending vertically superposed lines extending over both fields, indicia markings along the lines in one of said fields denoting diverse medical conditions to be treated, at least one marking element for each line of the other field, means forming an additional line in that other field bearing a scale for the ultrasonic output energy, a pointer movable over that other field and said scale in accordance with the adjustment of said control member, and said control member operatively and mechanically coupled to said pointer.

10. Apparatus according to claim 9, comprising a further field carrying indicia denoting treatment factors.

11. Apparatus according to claim 9, wherein the aforesaid lines comprises transparent rodlike members forming said lines, and opaque bushings carried by said rodlike members and constituting said marking elements.

12. Apparatus according to claim 11, wherein said marking elements are horizontally movable along the respective rodlike members.

References Cited in the file of this patent

UNITED STATES PATENTS

| | | |
|---|---|---|
| 2,059,248 | Konig | Nov. 3, 1936 |
| 2,072,189 | Vollenbroek et al. | Mar. 2, 1937 |

FOREIGN PATENTS

| | | |
|---|---|---|
| 349,109 | Germany | Feb. 23, 1902 |
| 477,096 | Great Britain | Dec. 22, 1937 |
| 946,428 | France | Dec. 20, 1948 |